US008103501B2

(12) United States Patent
Mumm et al.

(10) Patent No.: US 8,103,501 B2
(45) Date of Patent: Jan. 24, 2012

(54) SYSTEM AND METHOD FOR GENERATION AND AUTHENTICATION OF A SIGNED DOCUMENT USING VOICE ANALYSIS

(75) Inventors: Marc Mumm, Munich (DE); Chris Holland, Deisenhofen (DE)

(73) Assignee: Voicecash IP GmbH (CH)

( * ) Notice: Subject to any disclaimer, the term of this patent is extended or adjusted under 35 U.S.C. 154(b) by 1197 days.

(21) Appl. No.: 11/778,898

(22) Filed: Jul. 17, 2007

(65) Prior Publication Data

US 2008/0177550 A1 Jul. 24, 2008

(30) Foreign Application Priority Data

Jan. 24, 2007 (DE) .......................... 10 2007 003 597

(51) Int. Cl.
*G10L 17/00* (2006.01)
*H04L 9/32* (2006.01)
(52) U.S. Cl. ......... 704/246; 704/273; 713/176; 713/180
(58) Field of Classification Search .................. 704/246, 704/270, 270.1, 273; 705/64, 75, 317, 318; 705/76; 726/4, 5, 17, 18; 713/176, 179, 713/180
See application file for complete search history.

(56) References Cited

U.S. PATENT DOCUMENTS

| | | | | |
|---|---|---|---|---|
| 6,292,437 B1 * | 9/2001 | Beard | ............................ | 367/197 |
| 6,948,069 B1 * | 9/2005 | Teppler | ............................ | 713/178 |
| 6,957,185 B1 * | 10/2005 | Labaton | ............................ | 704/500 |
| 7,039,708 B1 * | 5/2006 | Knobl et al. | .................. | 709/227 |
| 7,340,042 B2 * | 3/2008 | Cluff et al. | .................. | 379/88.02 |
| 7,363,376 B2 * | 4/2008 | Uhlik et al. | .................. | 709/227 |
| 2002/0049614 A1 * | 4/2002 | Rice et al. | ............................ | 705/3 |
| 2002/0104027 A1 * | 8/2002 | Skerpac | .......................... | 713/202 |
| 2002/0128844 A1 | 9/2002 | Wilson et al. | | |
| 2002/0178187 A1 * | 11/2002 | Rasmussen et al. | .......... | 707/513 |
| 2003/0028649 A1 * | 2/2003 | Uhlik et al. | .................. | 709/228 |
| 2003/0093678 A1 * | 5/2003 | Bowe et al. | .................. | 713/180 |
| 2004/0102959 A1 * | 5/2004 | Estrin | ................................ | 704/8 |
| 2004/0143556 A1 | 7/2004 | Graubart | | |
| 2007/0198533 A1 * | 8/2007 | Foygel et al. | .................. | 707/10 |
| 2007/0270126 A1 * | 11/2007 | Forbes et al. | ................. | 455/411 |
| 2008/0192901 A1 * | 8/2008 | Mumm et al. | ............. | 379/88.02 |
| 2009/0006254 A1 * | 1/2009 | Mumm et al. | ................... | 705/44 |
| 2009/0025071 A1 * | 1/2009 | Mumm et al. | ..................... | 726/7 |
| 2010/0165981 A1 * | 7/2010 | Kuppuswamy et al. | ...... | 370/352 |

FOREIGN PATENT DOCUMENTS

| | | |
|---|---|---|
| CA | 2369274 A1 | 7/2002 |
| WO | WO 00/31677 A1 | 6/2000 |
| WO | 2006111979 A2 | 10/2006 |

* cited by examiner

*Primary Examiner* — Martin Lerner
(74) *Attorney, Agent, or Firm* — Donald R. Boys; Central Coast Patent Agency, Inc.

(57) ABSTRACT

The invention refers to a process and an arrangement for the generation of a signed text and/or image document, in particular a digital document for electronic sending and/or for electronic storage. The invention is characterized by the fact that the name and/or an image and/or any other representation of a person, for example a person code, is attached to the basic document in combination with an authentication certificate, wherein the authentication certificate is generated as the result of a voice analysis of the person performed in relation with generation of the document in terms of timing.

14 Claims, 3 Drawing Sheets

Figure 1:
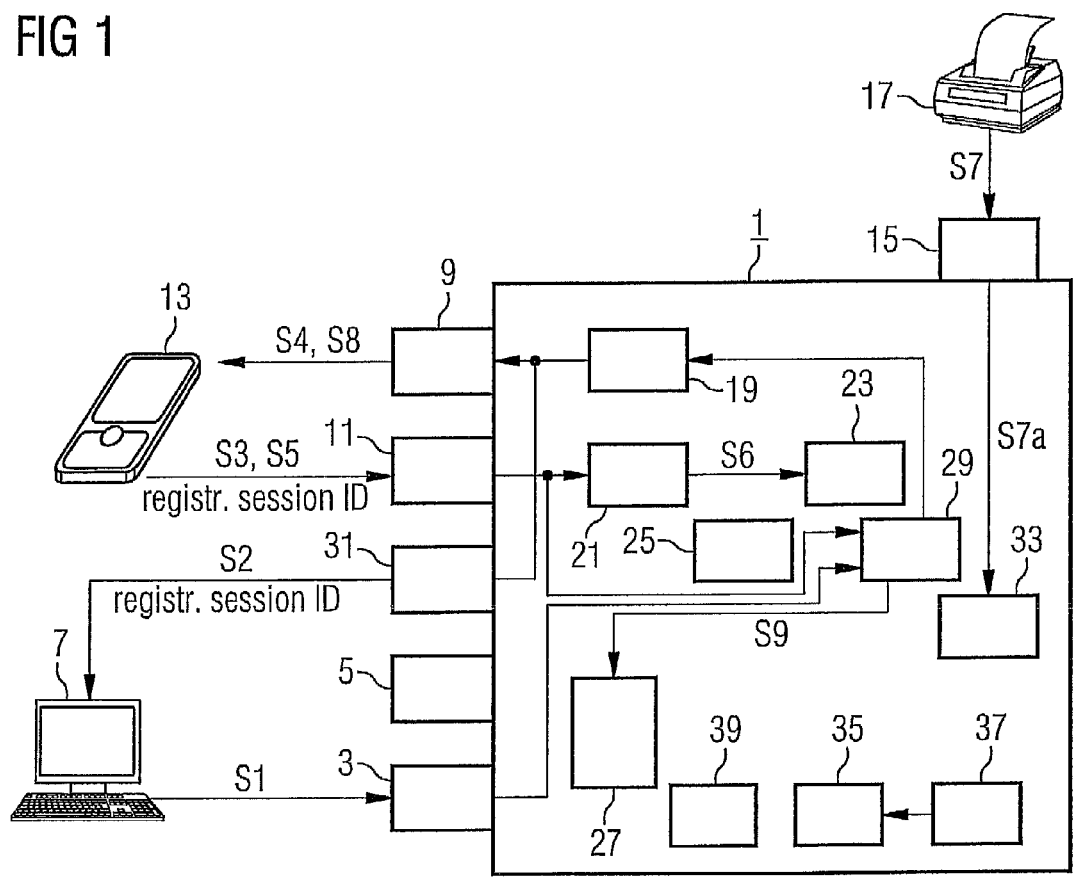

SYSTEM AND METHOD FOR GENERATION AND AUTHENTICATION OF A SIGNED DOCUMENT USING VOICE ANALYSIS

The invention refers to a process for generating a signed text and/or image document, in particular a digital document for electronic sending and/or for electronic storage, and a process for verifying such a signed document and to an apparatus for implementing these processes.

In electronic correspondence, i.e. particularly when text or other data files are sent by e-mail, the problem of checking authenticity acquires particular relevance because the handwritten signature that is common in conventional correspondence, where it is largely recognised as an indication of the authenticity of a document, is not provided for and other traditional authenticity indicators (coloured and/or embossed letterheads, special types of paper, post-office processing information, etc.) are not available. It must, however, be emphasised that the problem of checking the authenticity of documents sent, also in the case of conventional correspondence—and, here, in particular in the case of fax communication—, is only resolved sufficiently when security requirements are low. When security requirements are high, security measures lying outside the actual document are additionally taken, for example sending through clearly defined, protected channels or by the use of special return confirmation rituals.

For electronic correspondence, established encryption technologies, for example PGP, have also achieved considerable progress in the meantime with regard to recognition of a message's authenticity, besides their actual function of protecting against unauthorised access along the transmission route. The latter problem, however, is not satisfactorily resolved because in many cases the associated keys are not assigned to individuals, but to groups of persons and, in work environments, even individualised keys are often (or cannot) be kept reliably secret.

Techniques involving application of an electronic signature to documents, which are based on the allocation and use of an individualised signature card, are now known and established. These processes warrant a high security standard provided personal handling of the signature card meets this high standard. In practice, substantial losses of security arise due to a lack of security consciousness when handling the signature card. These processes also suffer from the typical problems of all card-based systems such as considerable disruptions and inconvenience when a card is misplaced or lost.

The invention is based on providing an improved process and an improved arrangement of the aforementioned kind which particularly reliably warrant a high security level, are insusceptible to errors and negligence in practical use and which can be handled by users without observing special security regulations that are difficult to comply with in their daily work.

In relation to its process aspect, this problem is also solved by a process with the characteristics of the independent process claim(s) and, in relation to its apparatus aspect, by arrangement with the characteristics of the independent apparatus claim(s). Expedient enhancements of the initiative concept are subject of the pending claims.

The invention includes the idea of providing the document to be identified or verified as authentic with a suitable certificate, which is created as the result of a process, which is triggered by the user generating the document or who is responsible for sending or storing it, who "warrants" the document's authenticity through his or her person, and in the course of which unique biometric data of this user is processed. It furthermore includes the idea of using this user's voice as a biometric group of characteristics for this certification process. This process is based on the knowledge that, after adequately differentiated initial registration, the voice timbre of the spoken word (or, if applicable, other spoken expressions) enables identification that is at least as similarly significant as a fingerprint or a retina image, and is therefore just as suitable as these for the creation of an authentication certificate.

By contrast, the considerable advantage of voice verification is that it can be realised from every telecommunications terminal device and thus practically in every working and living situation without further technical resources. In comparison with PIN-based or chip card or token based processes for proof of a user's identity in electronic data communication, the proposed process (like all processes based on biometric data) also has the advantage that a user's identity and not simply user knowledge (password or PIN) or a user's possession (token or chip card) is verified.

What is advantageous about the proposed process is also the possibility of setting a required security level on the basis of existing adequate experience-based values when generating and comparing a voice profile and in the realisation of the initial user registration (also referred to as enrollment) and later verification coordinated to the attainment of this security level. This makes it possible to set a fairly precise suitable compromise between the effort demanded of the user on the one hand and the security level on the other hand.

The proposed process also advantageously enables a live check of the user by virtue of the fact that voice samples selected by a random generator are demanded during authentication so as to prevent deception of the verification with voice recordings—while stored copies of other biometric characteristics of users who are no longer alive can be misused to deceive the relevant verification system.

The proposed process and the arrangement have further important advantages in relation to ergonomics and user acceptance. Thus, due to daily use of the spoken word as a means of communication with other persons, use of the voice for authentication purposes also suggests itself as a process that will not meet up with any acceptance barriers. Moreover, an authentication process based on use of the voice anyway enables integration in a voice-based and thus highly ergonomic user dialog "all of a piece". With the established means of voice synthesis, the user dialog and also the voice sample selection can also be adapted very easily to different or changing requirements.

In this patent application, an image of a person in the more general sense is to be understood as any exterior image, i.e. besides a photographic portrait also, for example, a simplifying drawing. A representation of the person is to be understood both as a biometric representation (retina or fingerprint) and also, for example an employee code, a pseudonym, etc. A person's voice profile is to be understood as a relevant entirety of the voice's attributes contained in the result of evaluation of voice samples with a previously defined algorithm, encompassing a large number of characteristic data points. Details of voice profile acquisition by calculation are not the subject of this patent application, however, and are therefore not described any further here.

According to realisation of the invention, in particular voice analysis is to include the generation of a current voice profile of a corresponding person and comparison by computation of the current voice profile against an initial voice profile of the assumed same person generated and stored in advance in the enrollment phase. Optionally, it is intended to place an electronic signature with the authentication certificate and optionally a signature image and/or a voice file of the person on the basic document.

In particular with a view to the generation and use of hard copies, for example for sending by post or filing, according to a further embodiment of the invention it is intended for the authentication certificate to be integrated in a 2D barcode and for this to be placed on the document.

A further embodiment of the invention is based on the assumption that, on placement of the authentication certificate, the document consists of a PDF file or a similar file resistant to editing and, in particular, is converted to a PDF file before placement. This additionally increases security in relation to the content of the documents, which ought to be inseparably related to the authenticated signature.

In a further advantageous embodiment it is planned for the generation of the current voice profile and/or the enrollment phase to feature transmission of voice samples by phone or VoIP terminal device to a voice sample input interface. It goes without saying that direct local input by microphone into an authentication server can also be provided for. Incidentally, the advantage of the use of biometric information entered as voice input via telecommunications terminal devices or a microphone is relatively high security in relation to typical disrupting data system interventions such as viruses.

In a manner that advantageously increases the system's security, it is planned for the generation of the current voice profile to feature enunciation of voice samples that have been previously determined using a random generator. As already mentioned above, this enables the so-called live check and, moreover, in total an efficient defence mechanism against the deceptive playback of voice sample copies into the system.

As an organisational tool for the process sequence, a special event identifier is advantageously assigned, which is referred to below as the session ID. Therefore, it is intended for a unique link to be created between the basic document and the authentication certificate in a system server, using a certification session ID, which is assigned to both the basic document and the respective voice analysis event. For a practical embodiment of the invention, it is also essential from the current point of view for placement of the authentication certificate on the document to be registered by a system server, in particular using the certification session ID and/or linked with a time stamp.

Furthermore, it is intended for the person in the current voice analysis to be identified on the basis of an internal system identifier such as a user ID, or an identifier of the terminal device such as the phone number or the MSISDN from where the person enunciates the voice samples. This additionally boosts security or enables, while maintaining a specified security level, boosting of user convenience by a possibility of reducing the number of voice samples to be provided.

In a further embodiment of the process, it is intended for an assigned image of the enrolled person's signature to be stored in the enrollment phase. A special event identifier may also be helpful in this embodiment. It is then intended for a unique link between the stored signature image and the stored voice profile of the person to be generated via an enrollment session ID that is assigned to both the event of the initial voice analysis and also acquisition of the signature image. The aforementioned signature image can be advantageously sent by fax or e-mail, especially as a PDF or image file, to a system administration unit (system server), where it can be processed in the aforementioned sense.

In the phase of verification of a document authenticated in advance in accordance with the invention, evaluation of the authentication certificate takes place and, as a result of the evaluation, the owner of the document is provided with unencrypted information on the signing/certification event. This information is such that the current user of the document is able to recognise, or can have recognised, whether the document was in actual fact signed by the alleged signatory. In particular, for this purpose the document is transmitted for evaluation to the system server, and this transmits personal information and/or time stamp information to a terminal device of the document owner. In this case, the time stamp information can serve as additional verification information or simply as information on the time when it was sent (independently of the security scheme).

During verification of a document existing (only) as a hard copy, for the purpose of verification it is preferably intended for a 2D barcode to be read on the document existing as a printed image. As the authentication information is contained in the 2D barcode, the system server thus receives the same information as when the document is transmitted electronically and can therefore also output appropriate verification information to the document owner.

A system conforming to the invention or an arrangement for realising the process described above comprises function units whose functions and combination already largely transpire from the explanation of the process, with the result that the device aspects largely correspond to the process aspects. It goes without saying that the realisation of such a system largely represents a software implementation, but which functions in combination with corresponding process and storage capacity which belong to the adapted input and output interfaces for the document on the one hand and to the information required for or resulting from authentication on the other hand.

This in particular consists of a basic document input interface and a document output interface or a voice sample input interface. A voice analysis facility for the realisation of voice analysis and acquisition of the respective voice sample and a certification unit for generation and placement of the authentication certificate on the (basic) document can be mentioned as essential processing components of the system. A voice profile storage unit and a voice profile comparison unit can also be mentioned.

In an embodiment of the invention it is furthermore intended for the system server to feature a personal data storage unit for storage of users' personal information assigned uniquely to a personally specific initial voice profile. The personal data storage unit can feature an image memory to store a signature image and/or a voice memory to store a voice file of the respective person, the image memory and/or wherein the image memory and/or the voice memory are connected to an input of the certification unit for attachment of the signature image or of the voice file on a document to be signed. Moreover, the personal data storage unit has a dedicated output interface for output of personal information to the owner of a document signed by the system server. The function units for storage and input/output of personal data can also be structured separately from the system server as a database with an applicable management system and can be linked to the system server via suitable interfaces.

In a further advantageous embodiment of the invention, it is intended for the system server to feature a user prompting unit for realisation of specific menu prompting in the enrollment and certification phases and to optionally feature a verification phase. The user prompting unit in particular comprises means of assigning an enrollment session ID or a certification session ID and for control of voice analysis as well as the storage operations to be associated to one another on the basis of the respective session ID.

It goes without saying that some of the interfaces mentioned may have a slightly different function during the certification phase on the one hand and the verification phase on the other hand and this applies equally to the prior phase of enrollment of authorised users (which is not subject of this patent application). Thus, in an embodiment of the invention it is intended for the basic document input interface to act as a document input interface during a verification phase. To this interface, and to the personal data output interface, a data terminal device of the owner of the document to be verified may be connected or to the document input interface a 2D barcode reader may be connected and a display unit may be connected to the personal data output interface.

Figure 2:
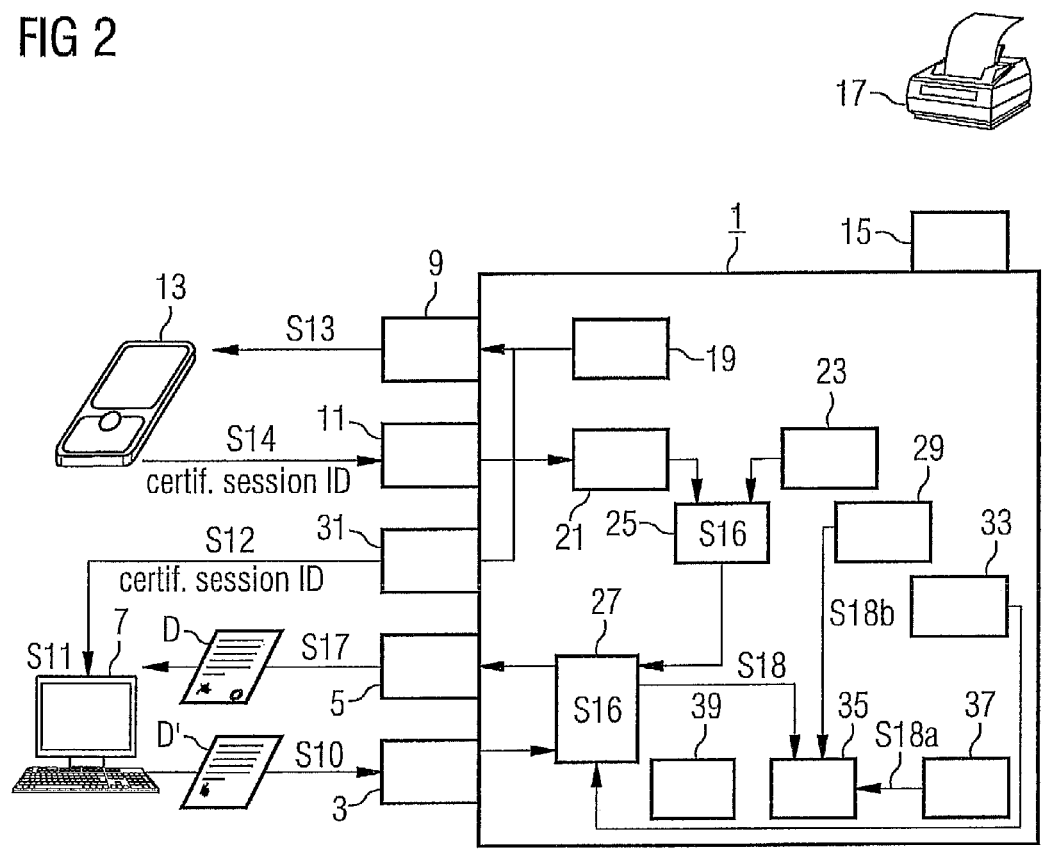
Figure 3:
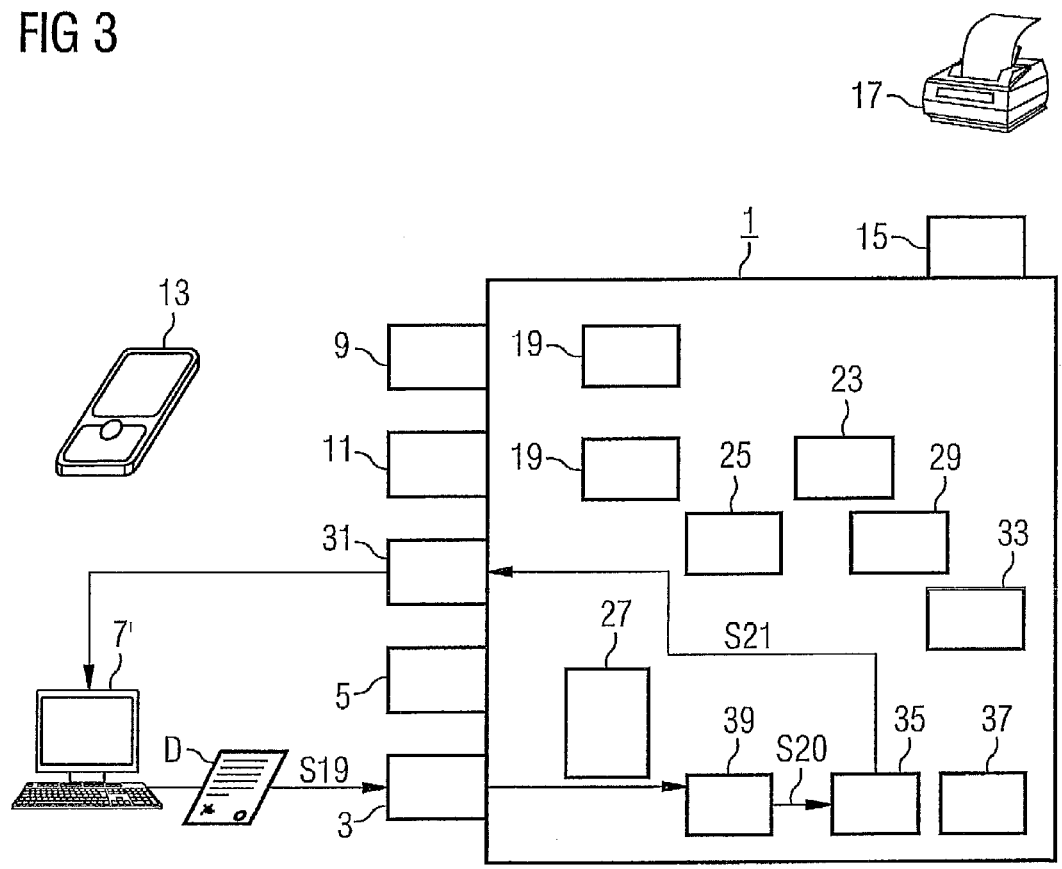

Advantages and practicalities of the invention otherwise result from the following description of a preferred variant example with reference to the figures. Of these:

FIG. 1 shows a schematic depiction of the system according to the invention in the enrollment phase, FIG. 2 shows a schematic depiction of the system according to the invention in the authentication phase, and FIG. 3 shows a schematic depiction of the system according to the invention in the certification phase.

One and the same embodiment of the arrangement according to the invention is sketched in FIGS. 1 to 3, and the signals of the components that are not active in the respective phase are not linked. First a description of the overall system structure is given. It is expressly mentioned that the structure sketched for explanation of the system's principal functions is highly simplified and cannot adequately reflect the specifics of certain input and processing operations taking place with the use of special software products.

The arrangement comprises a system server 1 that can be connected via a document input interface 3 at the input end and a document output interface 5 at the output end to a data terminal device 7 or 7' of a respective user, via a voice output interface 9 at the output end and via a voice sample input interface 11 at the input end to a mobile phone (telecommunications terminal device) 13 of a user and via a fax input interface 15 at the input end to a fax machine 17 of a user. To what extent the specified signal connections will actually be established will depend on the operating phase of the system, which is discussed in further detail below.

As essential internal functional units, the system server 1 has a user prompting unit 19 connected to the voice output interface 9, a voice analysis unit 21 (which can be linked by control signal to the user prompting unit 19) connected at the input end to the voice sample input interface 11, a voice profile storage unit 23 and a voice profile comparison unit 25 (which can be connected to one another in various ways), a certification unit 27 that can be connected at the input end to the document input interface 3, at the output end to the document output interface 5 and by control signal to the voice profile comparison unit 25, a personal data memory 29 with associated output interface 31 and, finally, an image memory 33 that can be connected at the input end to the fax input interface 15 and at the output end to the document output interface 31. The interface 31 also serves to output data not related to the document (for example menu prompting) to the data terminal device 7 or 7'. Finally, the system server 1 also comprises a certification data memory 35 for storing relevant data of the certification operation, which can be connected in the embodiment presented with a real-time clock 37 and with the personal data storage unit 29 or the verification data output interface 31 by control signal and, finally, with a certificate reader unit 39 via a further input.

During enrollment of a new user, as shown in FIG. 1, in a step S1 this person enters, via his or her data terminal device 7, specific initial information in the system server. A website of the system operator can be used for this purpose and the relevant information can comprise the name, the country, the phone number and further personal data of the new user. This data passes from the document input interface 3 acting here as the data input interface to the system server's personal data memory 29.

By means of the menu prompting unit 19, a suitable application (e.g. ActiveX, Java, JavaScript) is then executed to generate an enrollment session ID and, in a step S2, to realise the first part of user prompting. This encompasses opening of a popup window, for example, in which the enrollment session ID and a phone number are displayed, which the user ought to call to continue the enrollment process. Using his or her mobile phone 13, in a third step S3 the user then dials the specified phone number and enters his or her enrollment session ID within the scope of appropriate user prompting (realised by voice synthesis). Incidentally, the system server evaluates the user's mobile phone number for identification of the user in this step.

Within the scope of a further user prompt, referred to here as step S4, voice samples are requested of the user, which he or she enunciates via the mobile phone in a step designated S5 and which reach the system server via the voice input interface 11 and are analysed in the voice analysis unit 21 on the basis of the algorithm stored there for acquisition of a voice profile of the user. In a step S6, the voice profile is then stored in the voice profile memory 23.

In the embodiment presented, in a step S7 the user faxes (along with details of a user ID or also the enrollment session ID) a sample of his or her handwritten signature to the system server, which is stored there, in a step S7a, in the image memory 33, assigned to the recorded stored in the voice profile memory 23. In a further menu prompting step S8, the user finally receives the confirmation that he or she has been successfully registered and, in a step S9, an authentication certificate uniquely assigned to the registered user is stored in the certification unit 27. This completes the enrollment phase.

In the certification phase, which is sketched in FIG. 2, a basic document D' is authenticated on the basis of the certificate previously stored in the certification unit 27, and thus becomes the signed and authenticated document D. To this end, in a step S10, the basic document D' is first uploaded to the system server 1 via the document input interface (Web interface), either as a document already converted to PDF format in the data terminal device 7 or converted to the PDF format on the system server.

By double clicking on the basic document to place a box for the visual representation of the digital signature, in a step S11, the user initiates execution of an ActiveX, Java or JavaScript application in which a certification session ID is generation and transmitted, in a step S12, via the output interface 31 to the data terminal device 7 of the user requesting certification. The user is also displayed (similarly to the enrollment phase) a phone number to call.

The user dials this phone number and, in a step S14, and within the scope of a further user prompt SI3, enunciates the stipulated voice samples which reach the voice analysis unit 21 via the voice sample input interface 11, where they are analysed. In this operation, the user is once again identified via a mobile phone number (or a user ID assigned through another channel) and the consistency of the overall operation is warranted by the certification session ID. In a step S15, the current voice sample is compared against the voice profile from the enrolment phase stored in the voice profile memory 23 and, if they match, the comparison unit 25 outputs a corresponding signal to the certification unit 27. This signal then generates a current authentication certificate and, in a step SI6, attaches it to the basic document D', which now becomes the signed and authenticated document D, which the user downloads to his or her data terminal device in step SI7. The digital signature and authentication comprise the certification session ID and the phone number and previously stored certificate of the user, for instance. The session ID is also being stored in the certification data memory, in a step SI8, together with a time stamp (SI8a), thus ensuring that it is possible to track certification for any later verification of the document. At the same time, in the step SI8b relevant user data fetched from the user data memory 29 is stored along with it in relation to the event and is available for later verification in relation to the certification session ID.

It must be mentioned that, in this embodiment together with the digital signature and the authentication certificate, the user's signature image stored in the image memory 33 is placed on the document and is thus contained in the document file downloaded by the user.

In the verification phase presented in FIG. 3, another user of the system enters, on his or her data terminal device 7', the signed and authenticated document D in his or her possession for verification on the system server 1 (uploading by Web interface; step S19). In the certificate reader 39, in a step S20 the authentication certificate is read and assignment to the record stored under this ID in the certification data memory 35 is established via the certification session ID contained therein. In a step S21, in response thereto, the relevant data from the certification data memory 35 is output via the output interface 31 to the data terminal device 7' of the user. For example, the date and time of certification and the name of the signing user are displayed. The querying user can conclude on that basis that the document is genuine.

Realisation of the invention is not limited to the arrangement presented here and the process described, but is also possible in a large number of variants that lie within the scope of ordinary skill in the art. In particular, modifications are possible regarding user prompting (including the user terminal devices used) and the data/images/user attributes used during signing and certification. Thus, a voice file of the signing user can be linked to the document provided a corresponding file has been made available to the system beforehand (for example instead of the signature image or in parallel with it).

The invention claimed is:

1. In a computerized network system, a method for generation and authentication of a signed document over the network comprising the steps of:
 (a) providing to a service through an interactive interface provided by software executing from a digital storage medium associated with an Internet-connected server on the network providing the service, personal user data specific to a new system registrant, including textual or graphical digital data or images;
 (b) storing the user data provided in step (a) in a digital storage medium or memory associated with the server;
 (c) generating and providing to the new registrant unique enrollment session identifier and additional data required for continuing registration, said identifier and additional data displayable on a terminal data device connected to the system network and accessible by the registrant;
 (d) providing to the server via a telecommunications device initial voice samples of new registrant, said samples recorded, analyzed and stored along with personal data provided in step (a) in memory or other digital storage associated with the server;
 (e) assigning to the registered user a unique authentication certificate and storing said certificate in memory or other digital storage associated with the server;
 (f) uploading through a user data terminal device a new document to be certified and authenticated;
 (g) providing to the server via a telecommunications device current voice samples of new registrant, said samples recorded, analyzed and stored along with personal data provided in step (a) in memory or other digital storage associated with the server;
 (h) comparing in a voice comparison unit associated with the server current voice samples provided in step (g) with initial voice samples provided in step (d), and if matched, providing a corresponding output signal to a certification unit associated with the server, said signal generating a current authentication certificate; and
 (i) attaching the authentication certificate of step (h) to the document of step (f) wherein the document becomes a signed and authenticated document downloadable to the user's data terminal device, and verifiable by another querying user;
 wherein in practice of the method separate system channels are utilized for generation and authentication of the signed document, and document data is transmitted via a channel other than that for transmitting voice data, and generation and authentication of the signed document is accomplished by a single end user registered to the system wherein the single user is the signer of the document.

2. The method of claim 1 wherein in steps (d) and (g) the signer is a subscriber to a mobile telecommunications network provider, and identification of the signer includes verification of the Mobile Subscriber Integrated Services Digital Network (MSISDN) number of the subscribed signer.

3. The method of claim 1 wherein in step (i) text, image or other data representing the signer is attached on the document in combination with the authentication certificate, the certificate generated as a result of signer voice analysis performed in timely fashion with the generation of the document.

4. The method of claim 3 wherein the voice analysis includes generation of current voice profile of the signer provided in step (i), and computerized comparison of the current voice profile against the initial voice profile provided in step (d), and stored in advance by the system at the time of the signer initially registering with the system.

5. The method of claim 4 wherein the initial or current voice profiles of the signer are generated by transmission over the network by a telecommunications or VoIP terminal device to a voice sample input interface connected to the server.

6. The method of claim 4 wherein generation of the current voice profile of the signer involves enunciation of voice samples predefined selected and provided by a computerized random generator associated with the server.

7. The method of claim 4 wherein the current voice analysis identifies the signer based on an internal system identifier such as user ID, telephone number or MSISDN of the telecommunication terminal device of a signer.

8. The method of claim 3 wherein the authentication certificate is integrated in a 2D barcode attached to the document.

9. The method of claim 8 wherein the document exists or is converted to a PDF file prior to attachment of the authentication certificate.

10. The method of claim 3 wherein the system server establishes a unique link between the document to be authenticated and the authentication certificate using a certification session ID assigned to both the document and the respective voice analysis.

11. The method of claim 10 wherein attachment to the document of the authentication certificate is registered by the system server using either or both in combination of the certification session ID and a timestamp.

12. The method of claim 1 wherein upon new user registration to the system a signature image of the registered user is stored by the system in relation to the registered user.

13. The method of claim 12 wherein a unique link between the stored signature image and the stored voice profile of the user is generated via an enrollment session ID assigned to both a procedure of an initial voice analysis and an acquisition of the signature image.

14. The method of claim 12 wherein the signature image is transmitted by fax or email to the system server as a PDF or graphics file.

* * * * *